United States Patent [19]
Robles

[11] Patent Number: 5,855,405
[45] Date of Patent: Jan. 5, 1999

[54] SUN VISOR WITH EXTENDING SHIELDS

[76] Inventor: Urbano J. Robles, 21625 Woodland Crest Dr., Woodland Hills, Calif. 91364

[21] Appl. No.: 969,769

[22] Filed: Nov. 13, 1997

[51] Int. Cl.⁶ .......................................................... B60J 3/00
[52] U.S. Cl. ........................................ 296/97.4; 296/98.8
[58] Field of Search .................................. 296/97.8, 97.6, 296/97.4

[56] References Cited

U.S. PATENT DOCUMENTS

| | | | |
|---|---|---|---|
| 2,134,414 | 10/1938 | Norcross | 296/97.8 |
| 4,323,275 | 4/1982 | Lutz | 296/97.8 |
| 4,792,176 | 12/1988 | Karford | 296/97.8 |
| 4,989,910 | 2/1991 | Mersman et al. | 296/97.8 X |
| 5,104,174 | 4/1992 | Gute | 296/97.8 X |
| 5,112,096 | 5/1992 | Keenan | 296/97.8 X |
| 5,466,029 | 11/1995 | Zetterlund | 296/97.8 |

*Primary Examiner*—Joseph D. Pape
*Attorney, Agent, or Firm*—Albert O. Cota

[57] ABSTRACT

A sun visor with extending shields, which include a forward member (30) configured for attachment to a support rod (32). An extending shield actuator (46) is disposed within a recess (38) in the forward member and is attached to a lower glare shield (60). A left and right horizontal glare shield (64) and (70) are slidably attached to an extending column projecting from the actuator including a post (52), spacer (56) and lever (58). A back member (76), with a stepped indentation (78), is attached to the forward member thereby forming a hollow visor. When the lever is manually pulled down through a slit (80) in the back member, the extending column on the actuator interfaces with diagonal slots (66) and (66') in the horizontal shields, thus extending them outward in an opposite direction while simultaneously extending the lower shield. Shield corners (72) rotate downward by gravity as they are pivotally attached to the corners of the horizontal shields, thus completing the shielded beneath and on both sides of the visor.

13 Claims, 4 Drawing Sheets

FIG. 3

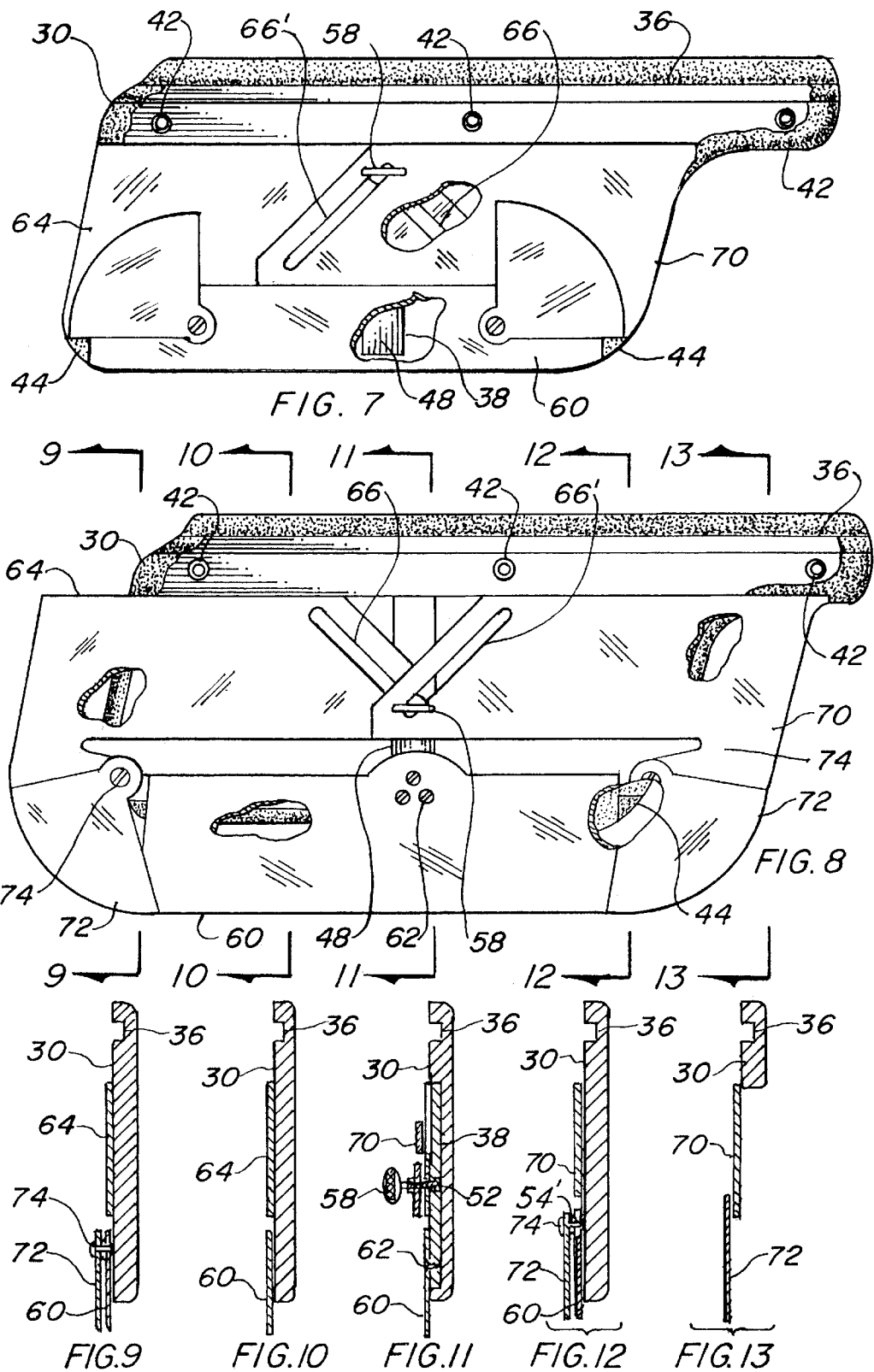

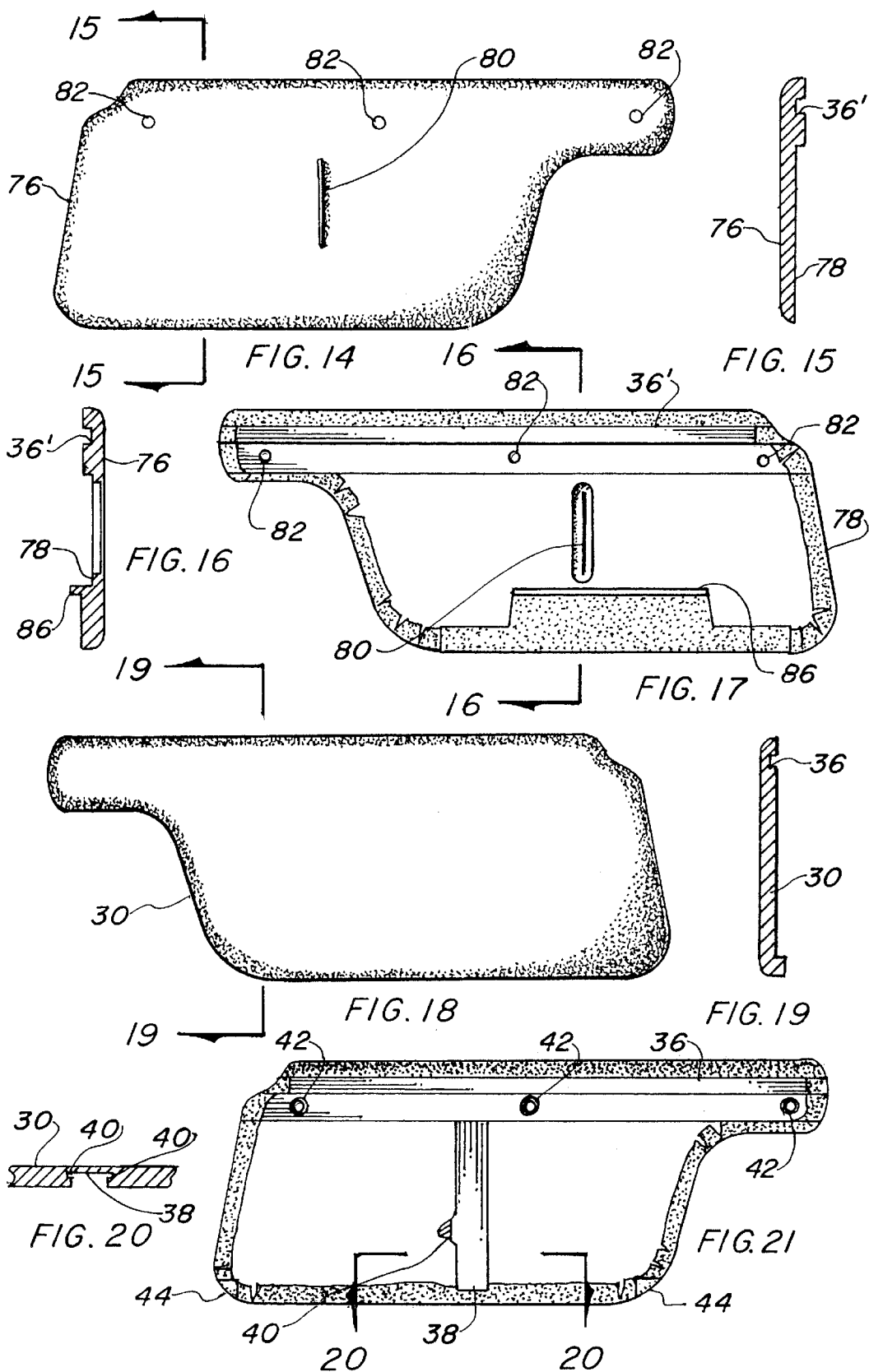

SUN VISOR WITH EXTENDING SHIELDS

TECHNICAL FIELD

This invention relates to vehicle sun visors in general and more specifically to sun visors for automobiles and trucks with retractable glare shields made of tinted transparent plastic material.

BACKGROUND ART

Previously, many types of sun shields have been used to provide an effective means for shading a vehicle's driver and Passengers from the direct rays of the sun or other reflective sources. It is a fact that nearly all automobiles and trucks in today's market contain opaque sun visors that are included as standard equipment. Prior art has attempted to extend the utility of these sun visors by appending a transparent auxiliary glare shield or screen beneath or at the side of the existing visors. The reason for this addition is that while most visors generally perform adequately, it is often desirable to Posses a tinted transparent shield through which a driver may see but that also reduces the intense light and bright glare that emanates from many ambient objects.

Attempts to achieve this utility in the past include, clip on glare screens that pivot or slide downward beneath the visor or that swing down from a rotating joint that extends to the desired distance and held in place by friction of the joint. Other devices position a screen inside the visor which can be pulled down or add a side section that can slide horizontally from the visor. These basic attempts fill the need in a rudimentary manner however, they are for the most part unsightly or too complex in construction and operation to be satisfactory to the vast majority of users.

A search of the prior art did not disclose any patents that read directly on the claims of the instant invention, however the following U.S. patents are considered related:

| U.S. Pat. No. | INVENTOR | ISSUED |
| --- | --- | --- |
| 2,134,414 | Norcross | 25 October 1938 |
| 2,733,763 | Nygaard | 7 February 1956 |
| 3,208,792 | Martin | 28 September 1965 |
| 3,410,602 | Schuler | 12 November 1968 |
| 3,853,370 | Barnhart | 10 December 1974 |
| 4,323,275 | Lutz | 6 April 1982 |
| 5,472,255 | Moore | 5 December 1995 |

Norcross in U.S. Pat. No. 2,134,414 teaches a glare screen inside a visor which is manually or electrically pulled down to extend beneath the visor.

Pat. No. 2,733,763 issued to Nygaard teaches basically the same structure and function as above in the manual mode with serrations on each side of a rod to retain the shield at a specific location.

Martin in U.S. Pat. No. 3,208,792 discloses a visor attachment that clips on and slides downward for use.

Pat. No. 3,410,602 of Schuler discloses a clip-on device with dual colors that slips downward and rotates to the desired position.

Barnhart's Pat. No. 3,853,370 employs a spring-loaded shield with an extension guide member which latches to a notch for positioning. An adjustable clamping base attaches the device to the visor.

Pat. No. 4,323,275 issued to Lutz teaches a housing attached to a visor with three auxiliary shield that may be withdrawn from slots in the visor.

U.S. Pat. No. 5,472,255 issued to Moore teaches a sun visor which has a retractable sun screen. The screen is folded or rolled up into the visor for deployment beside the front window as well as the windshield.

For background purposes and as indicative of the art to which the invention relates reference may be made to the remaining cited patents.

| U.S. Pat. No. | INVENTOR | ISSUED |
| --- | --- | --- |
| 1,958,934 | Williams | 15 May 1934 |
| 3,954,297 | Linke, et al | 4 May 1976 |
| 4,728,142 | Gavagn | 1 March 1988 |
| 4,828,314 | Gavagn | 9 May 1989 |
| 4,919,469 | Aizawa | 24 April 1990 |
| 4,988,139 | Yamada | 29 January 1991 |
| 5,478,131 | Marks | 26 December 1995 |

DISCLOSURE OF THE INVENTION

Sun visors for automotive and other vehicles have been in constant use since the advent of the automobile, as drivers are forced to be in situations where the sun or a reflected glare is shinning directly into their eyes. While the visor itself completely blocks the sun, it is still necessary to reduce the glare still present around the edges of the visor. Prior art has attempted to solve this problem, as previously discussed, however this entails unsightly appendages attached to the outside surface of the visor or only partial peripheral coverage for internal shields.

It is therefore a primary object of the invention to completely enclose extendable shields within the visor and to have only a simple unobtrusive manual lever extending through a slot in the center of one side of the visor. When the visor is in the stored position it is unapparent that any alteration has been made to the visor, as its appearance is substantially identical. When the visor is pivoted down for use the lever is seen, otherwise no indication of hidden shields are visually conspicuous.

An important object of the invention is that the shields extend in three directions, thus covering all of the exposed sides of the visor simultaneously with operation of a single lever. The top of the visor needs no shields as it is installed above the windshield or side window. There are situations however where any one of the three remaining sides may be used for viewing the road. The invention covers all of these needs with no further manipulation by the driver required, other than the initial lowering of the lever.

Another object of the invention is the ability to mount the modified visor onto any conventional automotive visor arm. As each model and make of car may have different arm lengths and diameters, the invention may be easily altered to the correct size by a single dimensional change.

Still another object of the invention is its ease of use, as only one uncomplicated lever is utilized for extending the glare shields. As the visor has the same visual appearance of any conventional visor the only difference is the lever, which has a slot directly beneath it that is visible only when the visor is pivoted downward for use. Instructions for the invention are not absolutely necessary as the operation and use are conspicuously evident, as the lever and slot indicate that the lever should be lowered into the slot. Once the device has been used its operation is easily remembered for any subsequent use.

Yet another object of the invention is that driving safety is improved as there are occasions when the sun is directly in front of the vehicle and it is difficult to see anything in front even with the visor down as the sun's reflective glare is still present. The invention permits the driver to block the sun with the visor and eliminate any glare with the optically tinted shields. The shields are preferably made of a thermoplastic material such as acrylic, polystryene or polycarbonate, which are available with properties of solar transmittance from 10% to 92% and reflective values from 4% to over 60% in a wide range of tints or colors. The glazing material of the shields may be polarized to further block the reflection from the road or other reflective surfaces.

It is apparent that the hazardous conditions of driving into the sun may be reduced with the use of the invention, as solar glare may be eliminated, or substantially decreased, while still being able to see the road clearly and with precision.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 7 is a front view of the forward member of the visor with the back member removed.

FIG. 8 is a front view of the forward member of the visor with the back member removed and the glare screen extended.

FIG. 9 is a cross sectional view taken along lines 9—9 of FIG. 8.

FIG. 10 is a cross sectional view taken along lines 10—10 of FIG. 8.

FIG. 11 is a cross sectional view taken along lines 11—11 of FIG. 8.

FIG. 12 is a cross sectional view taken along lines 12—12 of FIG. 8.

FIG. 13 is a cross sectional view taken along lines 13—13 of FIG. 8.

FIG. 14 is a front view of the back member of the visor completely removed from the invention for clarity.

FIG. 15 is a cross sectional view taken along lines 15—15 of FIG. 14.

FIG. 16 is a cross sectional view taken along lines 16—16 of FIG. 17.

FIG. 17 is a front view of the forward member of the visor completely removed from the invention for clarity.

FIG. 18 is a front view of the forward member of the visor completely removed from the invention for clarity.

FIG. 19 is a cross sectional view taken along lines 19—19 of FIG. 18.

FIG. 20 is a cross sectional view taken along lines 20—20 of FIG. 18.

FIG. 21 is a rear view of the forward member of the visor completely removed from the invention for clarity.

BEST MODE FOR CARRYING OUT THE INVENTION

Figures 1, 2:
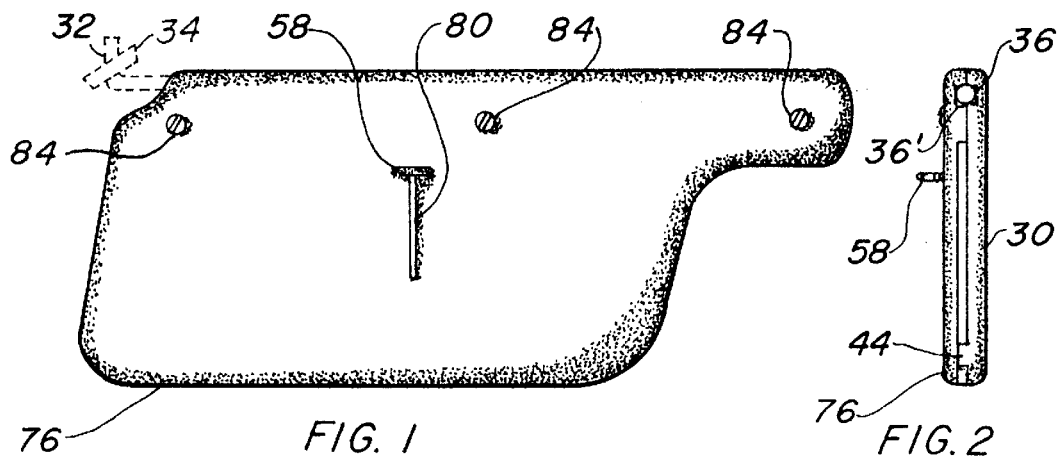
FIG. 1 is a front view of the preferred embodiment with an automotive visor arm and bracket shown in dashed lines.
FIG. 2 is a right side view of the preferred embodiment.
Figures 3, 4:
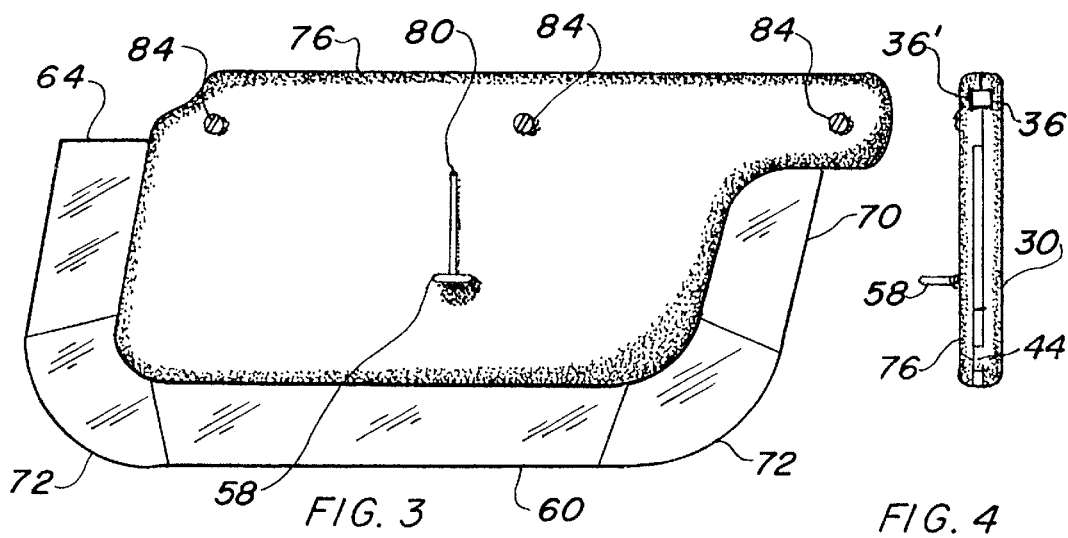
FIG. 3 is a front view of the preferred embodiment with the glare shields extended.
FIG. 4 is a right side view of the preferred embodiment with the glare shields extended.
Figures 5, 6:
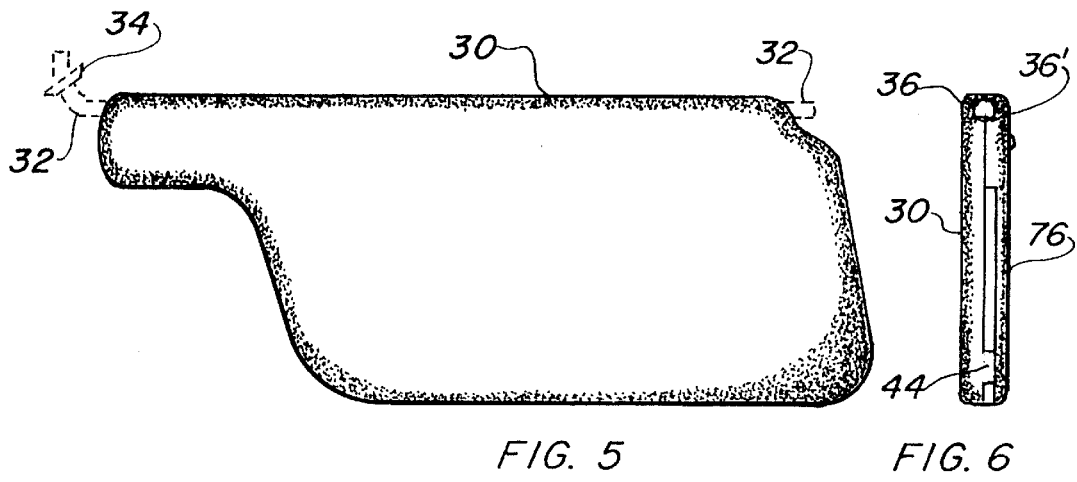
FIG. 5 is a rear view of the preferred embodiment with an automotive visor arm and bracket shown in dashed lines.
FIG. 6 is a left side view of the preferred embodiment as shown from the rear.

The best mode for carrying out the invention is presented in terms of a preferred embodiment. The preferred embodiment, as shown in FIGS. 1 through 28, is comprised of a visor forward member 30 that is shaped to fit flush upon a vehicle such as an automobile or truck headliner above the windshield.

This forward member 30 is designed to be pivoted down when in use, and includes a means to captivate an automotive visor support rod 32 that has a mounting bracket 34 on one end. This means to captivate the visor is in the form of a groove 36 that surrounds half of the rod 32 and holds it in place by compression against another similarly configured member. The forward member 30 is substantively flat as shown in FIGS. 18–21 and incorporates an actuator recess 38 on the inside surface, substantially in the middle. The recess 38 is configured rectangularly with a female bottom groove 40 on each of the longest sides.

A plurality of attaching receptacles 42, with three of the female threaded type being preferred, are mounted through the member 30, as illustrated in FIGS. 7 and 8, for attachment of a similar opposed member. A pair of corner bosses 44 extend upward on each lower corner for support of extending glare shields.

Figure 26:
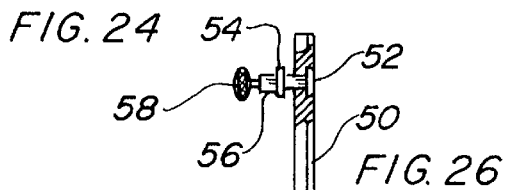
FIG. 26 is a cutaway right side view of the extending shield actuator completely removed from the invention for clarity.
Figure 27:
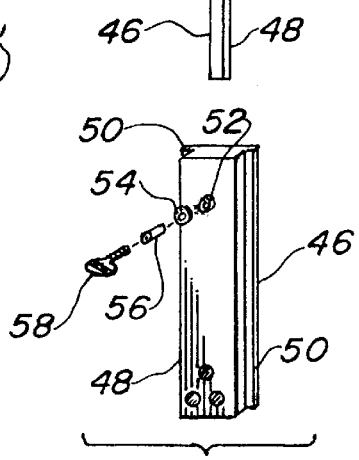
FIG. 27 is a partial isometric view of the extending shield actuator by itself, with the lever exploded from the actuator for clarity.

An extending shield actuator 46, illustrated in FIGS. 26 and 27, is slidably disposed within the actuator recess 38 of the forward member 30. The actuator 46 consists of a rectangular block 48 that is dimensioned to be retained and to slide freely within the recess 38. The block 48 may consist of a beveled block (not shown) or, as best shown in FIG. 27, the block may include a tongue 50 on each longitudinal side that slidably interfaces with the female bottom groove 40 in the forward member 30 to hold it in place. The block 48 has a female threaded post 52 protruding outward with a washer 54 and spacer 56 on top held in place with a thumb screw-like lever 58, thus providing a rigid outward extending column for actuation of the device. Alternatively, the post may be configured as an integral unit without the need for the washer 54 or the spacer 56.

Figure 24:
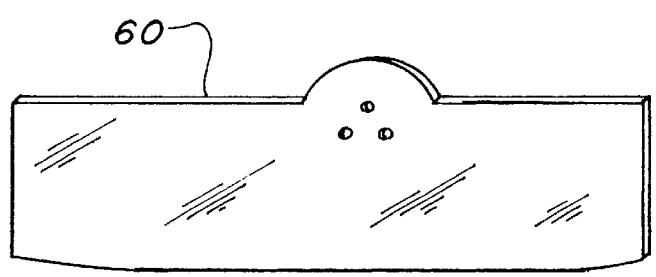
FIG. 24 is a front partial isometric view of the lower glare screen completely removed from the invention for clarity.

A lower glare shield 60, as shown by itself in FIG. 24, is rigidly attached by threaded fasteners 62 to the block 48 of the actuator 46, thus permitting the lower glare shield 60 to extend beneath the visor when the actuator 46 is manually lowered.

Figure 22:
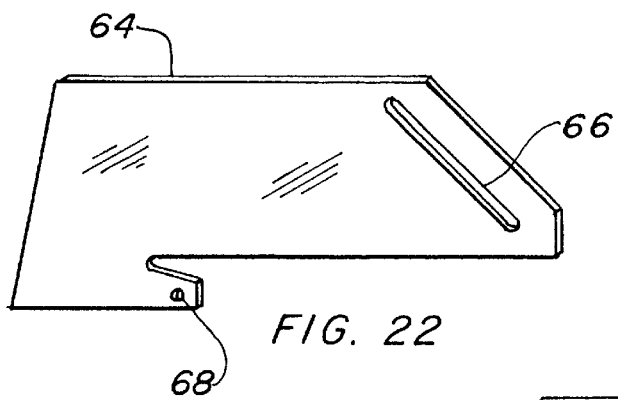
FIG. 22 is a front partial isometric view of the left horizontal glare screen completely removed from the invention for clarity.

A left horizontal glare shield 64 is depicted separately in FIG. 22 and assembled in FIGS. 7 and 8. This shield 64 includes an inward sloping diagonal slot 66 that slidably engages the post 52 of the actuator 46 and has an attaching hole 68 near the bottom edge as illustrated.

Figure 23:
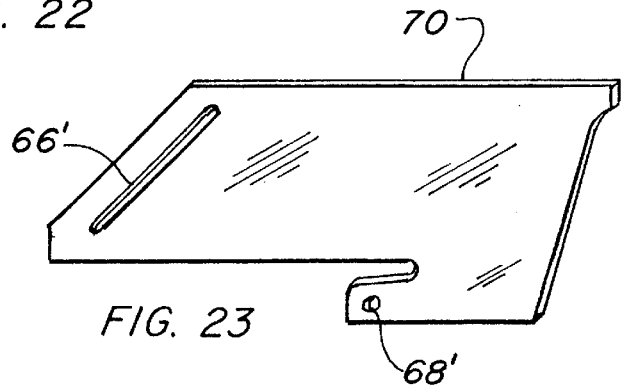
FIG. 23 is a front partial isometric view of the right horizontal glare screen completely removed from the invention for clarity.

A right horizontal glare shield 70 is depicted separately in FIG. 23 and as assembled in FIGS. 7 and 8. This shield 70 partially overlaps the left shield 64 and further includes an inward sloping diagonal slot 66' in mirror image of the slot 66 in the shield 64. The right shield 70 also incorporates an attaching hole 68' in the bottom edge as illustrated.

The slot 66' in the right shield 70 slidably engages the shield actuator 46 in a similar manner as the left shield 64 except the right shield is on top. During use, the actuator 46 is manually lowered, thus forcing the left and right shields 64 and 70 outward in opposed directions as the actuator impinges on the angled slots 66 and 66'.

Figure 25:
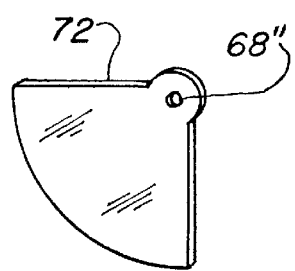
FIG. 25 is a front partial isometric view of the right glare screen corner completely removed from the invention for clarity.
Figure 28:
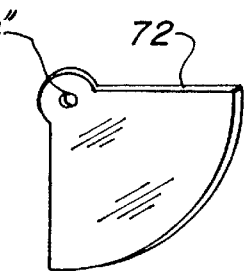
FIG. 28 is a front view of the left glare screen corner completely removed from the invention for clarity.

A pair of hinged glare shield corners 72 are pivotally attached to the outside corner of each horizontal shield 64 and 70. The pivotal attachment is comprised of a fastener and spacer in the form of a screw and flanged post 74 or other means, such as a hollow rivet, grommet, flanged fastener or the like. The attachment method utilizes the holes 68 and 68' in the horizontal shields 64 and 70. Similar holes 68" are employed in the shield corners 72 as illustrated in FIGS. 25 and 28. Additionally, washers 54' may be used between the hinge shield corner 72 and the horizontal glare shield 64 or 70 as a spacer for free movement. When the horizontal shields are extended outward, the corners 72 swing down in between the horizontal shields 68 and 70 and the lower shield 60, thus maintaining visual protection for the three exposed sides of the sun visor as well as both lower corners.

The lower shield 60, horizontal shields 64 and 70 as well as the shield corners 72 are made of optically clear thermoplastic, which is tinted to reduce the intensity of the solar transmittance.

This thermoplastic material may be acrylic, polystryene, polycarbonate or any other material suitable for the application. It has been found that a thickness of 0.075 inches (0.19 centimeters) is ideal for the shields. The tint to reduce the transmittance reflectivity and absorbance may be in a various of colors, such as gray, green, bronze, etc., or even a mirrored or reflective surface as such characteristics are common in the art. The above material may also be polarized to reflect the incident of light in a single direction.

The visor is enclosed with a back member 76 that is shaped to match the configuration of the forward member 30. The back member 76 also includes means to capture an automotive visor support rod 32 in the form of a longitudinal groove 36', as shown in FIGS. 15–17, that surrounds the other half of the rod and is compressed into place when the forward member 30 is attached to the back member 76. The back member 76 has a stepped indentation 78 on the inside surface to retain and guide the glare shields 60,64,70 and 72 when they are retracted between the forward and back members. The back member 76 contains a slit 80, which allows the lever 58 to penetrate and slide downward. A number of bores 82 are in alignment with the forward member attaching receptacles 42 to receive screws 84 for attaching the two members 30,76 together. This union forms a complete sun visor housing, which encloses the glare shields when they are not extended. An upstanding rib 86 retains the horizontal shields 64 and 70 on the bottom, thus restricting their movement to only a horizontal direction.

The forward and back members 30,76 may be fabricated of any material such as thermoset or thermoplastic material, which is foamed or injected into molds, pressed board, or other synthetic materials similar to those in present use in automobile sun visors. The outside surface of these members 30,76 may be covered with fabric such as the type found in a vehicle's headliner, which includes imitation leather, natural leather or any other material or substance suitable for the application.

During use the visor is hinged downward on the support rod 32 and is used in its conventional manner. When desired, the driver pulls the outward extending lever 50 down through the slit 80 extending the lower shield 60, as they are both attached rigidly to the actuator block 48. As previously discussed, the actuator block 48 includes an extending column consisting of a post 52. The post 52 penetrates the slot 66 in the left horizontal shield 64 with the washer 54 retaining its movement and a spacer 56 contiguous with the washer 56 penetrating the slot 66' in the right horizontal shield 70 with the lever 56 holding the column in place. As the lever 58 is lowered, the column impinges on the slots 66 and 66' thus forcing the horizontal shields 64 and 70 outward as the rib 86 on the bottom and the indentation 78 on the top confines any vertical movement of the shields 64 and 70. As the horizontal shields 64 and 70 extend, the unsupported corners 72 drop down by gravity to fill the gap thereby completing the extension. The driver simply pushes the lever 58 up in order to retract the shields.

While the invention has been described in complete detail and pictorially shown in the accompanying drawings it is not to be limited to such details, since many changes and modifications may be made in the invention without departing from the spirit and scope thereof. Hence, it is described to cover any and all modifications and forms which may come within the language and scope of the appended claims.

I claim:

1. A sun visor with extending shields comprising:
   a) a visor forward member shaped to fit an automotive headliner above a windshield having means to captivate an automotive visor support rod that has a mounting bracket, and said forward member further having an actuator recess therein;
   b) an extending shield actuator slidably disposed within the actuator recess in the visor forward member;
   c) a lower glare shield rigidly attached to the actuator such that the lower glare shield extends beneath the visor forward member when the shield actuator is manually lowered;
   d) a left horizontal glare shield having an inwardly sloping diagonal slot slidably engaging the shield actuator;
   e) a right horizontal glare shield, partially overlapping the left shield, with said right glare shield having an inwardly sloping slot slidably engaging the shield actuator such that when the actuator is manually lowered, both the right and left shields are simultaneously urged outward in opposed horizontal directions;
   f) a pair of hinged glare shield corners pivotally attached to an outside corner of each left and right glare shield such that when each horizontal shield is extend outwardly, the corners swing down to cover in between the horizontal and lower shields extending visual protection on three sides of the sun visor including the corners; and
   g) a visor back member shaped to match the forward member having means to captivate an automotive visor support rod including a mounting bracket and said back member having a stepped indentation to retain and guide the lower, left horizontal, right horizontal and corner glare shields when retracted between the forward and back members, the back member attached to said forward member forming a complete sun visor housing enclosing the glare shields when not extended.

2. The sun visor as recited in claim 1 wherein said visor forward member having a longitudinal groove therein for captivating an automotive visor support rod, a plurality of attaching receptacles for connection to the back member, said actuator recess further having female bottom grooves therein and a pair of corner bosses extending upwardly on each lower corner.

3. The sun visor as recited in claim 1 wherein said visor forward and back member are covered with fabric.

4. The sun visor as recited in claim 1 wherein said visor forward and back member are covered with imitation leather.

5. The sun visor as recited in claim 1 wherein said visor forward and back member are covered with natural leather.

6. The sun visor as recited in claim 1 wherein said shield actuator further comprises a rectangular block of a size to be retained and slide freely within said actuator recess, the actuator further having a lever providing a rigid outwardly extending column positioned within the slots of the right and left glare shields extending the shields outwardly when the block is manually lowered by the lever.

7. The sun visor as recited in claim 1 wherein said shield actuator further comprises a rectangular block of a size to be retained and slide freely within said actuator recess, the block having a tongue on each longitudinal side and said actuator recess having a matching bottom groove on each side to retain the block therein, the actuator further having a female threaded post attached to the block with a washer and spacer on top held in place with a thumb screw like lever providing a rigid outwardly extending column positioned within the slots of the right and left glare shields extending the shields outwardly when the block is manually lowered by the lever with the post and spacer continuously engaging the slots causing the respective shields to extend outwardly.

8. The sun visor as recited in claim 1 further comprising threaded fasteners attached through the lower glare shield into the shield actuator to produce a rigid interface therebetween.

9. The sun visor as recited in claim 1 further comprising a fastener and spacer loosely connecting the hinged shield corners to the left and right shields such that they may easily fall by gravity when unsupported.

10. The sun visor as recited in claim 1 wherein said visor back member having a longitudinal groove therein for captivating an automotive visor support rod, a plurality of bores in alignment with the visor forward member attaching receptacles.

11. The sun visor as recited in claim 1 wherein said lower, left, right and corner glare shields are optically clear thermoplastic tinted to reduce solar transmittance.

12. The sun visor as recited in claim 1 wherein said lower, left, right and corner glare shields are polarized optically clear thermoplastic.

13. A sun visor with extending shields comprising:
a) a visor back member contiguously engaging a visor forward member, said forward member having an actuator within an internal recess, said actuator attached to a lower glare shield;
b) a left and right glare shields having outside corners slidably retained within the visor members;
c) a pair of glare shield corners pivotally attached, one on each left and right shield outside corner; and
d) an extending column projecting from the actuator through the left and right shields and visor such that when the column is manually pulled downwardly the lower shield and left and right shields are urged outward and the corners pivot outwardly expanding the area of usable surface of the sun visor.

* * * * *